United States Patent Office 3,594,252
Patented July 20, 1971

3,594,252
TELEBLOCK POLYMER BACKING FOR TILE AS SUBSTRATE OVERLAY MATERIAL
Betty B. Weinberg, Bartlesville, Okla., assignor to Phillips Petroleum Company
No Drawing. Filed May 27, 1968, Ser. No. 732,097
Int. Cl. B32b *31/14*
U.S. Cl. 156—297
10 Claims

ABSTRACT OF THE DISCLOSURE

Tile is bonded to a backing of teleblock polymer and said article is applied as an attractive, waterproof, insulated, sound deadening, resilient substrate overlay.

---

This invention relates to an article of manufacture wherein tile is bonded to a backing of teleblock polymer. This invention further relates to a method of using said article of manufacture as a substrate overlay.

Generally, in the past, laying tile, such as ceramic tile, has involved a series of difficult operations.

Usually, the substrate surface must be especially prepared. The surface must be waterproofed for cementing and grouting so as to provide a moisture barrier. The surface is then usually covered with a paper backing and the tiles loosely attached thereto. Over this prepared surface and the spaces between the tile is applied a grouting material. This general procedure is very time consuming and the spacing of tile involves estimation and judgment often resulting for the amateur in uneven and unattractive tile coverage.

It has now been discovered that tile can be securely bonded to a backing of unvulcanized, high green strength teleblock polymer which comprises polymers of a conjugated diene and a vinyl aromatic compound by rendering the polymer tacky by a swelling solvent material and bonding the tile directly thereto or by bonding said tile to the teleblock polymer backing using a teleblock glue which comprises polymers of a conjugated diene and a vinyl aromatic compound.

I have further discovered a method of using and applying said articles so as to eliminate the tedious procedures related to the laying of tile. The teleblock polymer mat, which can be foamed, is softened by solvent swelling of the teleblock polymer or by use of a teleblock glue and attached to the substrate.

My novel article of manufacture and my method of applying said article as a substrate overlay provided many advantageous features and comprises several objects.

It is an object of this invention to provide a convenient, swift, and sure means for attractively covering the desired substrate.

It is an object of this invention to provide a manufactured article of tile to essentially eliminate the tedious application and spacing procedures required to lay single tile.

It is an object of this invention to provide the means whereby whole sections of tile may be laid or cut to the desired shape for application.

It is an object of this invention to provide a waterproof, insulated, sound deadening, resilient substrate overlay that is easily applied.

It is a further object of this invention to provide a convenient method for applying teleblock polymer bonded tile to the substrate.

Other objects, features, and advantages of my invention will be apparent to those skilled in the art from the following disclosure and discussion.

I have discovered that tile can be attached firmly to a backing of teleblock polymer. The teleblock polymer backing can be any desired thickness but normally is from about 10–60 mils.

The linear teleblock polymers suitable for use in this invention can be made according to U.S. Pat. 3,030,346 issued to Cooper on Apr. 17, 1962. In a broad sense, linear teleblock polymers are molecules which contain three or more dissimilar joined segments or blocks wherein the two terminal segments are substantially similar. These polymers are characterized by having a segment of a polymer joined in an end-to-end arrangement through a primary chemical bond with a segment of a second polymer and the second polymer is joined in an end-to-end arrangement through a primary chemical bond with a segment of a third polymer etc., such as: SSSS—BBBB—SSS or BBBB—SSSSS—BBBB, wherein S and B represent molecules of styrene and butadiene or suitable substituted monomers respectively, and schematically characterizes the monomer sequence of the linear teleblock polymers. Each segment of the teleblock polymer can be a sequence of units of a substantially single monomer, as has been characterized above but alternate segments can also be a sequence of randomly copolymerized units; some of which are schematically characterized below:

BBBB—SBBSSSBB—BBBB
SSSS—BBSSBB—SSSS

Radial teleblock polymers, suitable for use in my invention, are commercially available from Phillips Petroleum Company and can be made according to U.S. Pat. 3,281,383 issued to Zelinski et al., on Oct. 25, 1966. The radial teleblock polymer is characterized by a branched block copolymer having at least three polymer branches. Each branch comprises two or more dissimilar joined polymer segments and each segment can comprise a sequence of units of a substantially single monomer but alternate segments of the branch can also be a sequence of randomly copolymerized units. It is preferred that the terminal polymer blocks in each of the radial branches comprise styrene or a suitable substituted vinyl aromatic monomer.

The relative amounts of styrene and butadiene or their suitable substituted monomers can vary over a wide range. Linear or radial teleblock polymers of styrene/butadiene can comprise in the range of 60 to 80 weight percent butadiene, or suitable substituted conjugated diene monomer, 40 to 20 weight percent styrene, or suitable substituted vinyl aromatic monomer, with a preferred range of 60 to 70 weight percent butadiene, or suitable substituted monomer, and 30 to 40 weight percent styrene, or suitable substituted monomer.

Each polymer segment of the linear teleblock polymer comprises at least 15 mol percent of the total amount of that polymer present in the whole linear teleblock polymer molecule.

Each terminal polymer segment in the radial branches of the radial teleblock polymer comprises at least 5 mol percent of the total amount of that polymer present in the whole radial teleblock polymer molecule.

Examples of vinyl aromatic compounds suitable as substitutes for styrene comprise 3-methylstyrene, 4-n-propylstyrene, 4-cyclohexylstyrene, 4-dodecylstyrene, 2-ethyl - 4 - benzylstyrene, 4-p-tolylstyrene, 4-(4-phenyl-n-butyl)styrene, and the like. Suitable examples of conjugated dienes that can be substituted for butadiene comprise isoprene, 2,3-dimethyl-1,3-butadiene, piperylene, 3-butyl-1,3-octadiene, 1-phenyl-1,3-butadiene, and the like.

This high green strength rubber found to possess unusual properties and characteristics was surprisingly discovered to be easily bonded to tile, such as ceramic tile, by rendering the polymer tacky by applying a solvent swelling material such as benzene, acetone, toluene, xylene, cyclohexane, etc., and attaching the tile directly thereto. Teleblock polymer backing can also be bonded to the tile by applying a bonding cement which comprises a solution of teleblock polymer in a solvent such as acetone, benzene, toluene, xylene, cyclohexane, Stoddard solvent, ethyl acetate, methyl ethyl ketone and the like.

Strips of tile on this teleblock matting can be paid directly on a wood, cement, cardboard, asbestos board, sheeting, plaster, or like substrate. The matting can be firmly attached to the substrate in a novel manner by using a swelling solvent material to make the rubber backing slightly tacky or by applying a cement comprised of a solution of teleblock polymer in a solvent solution such as benzene, actone, toluene, xylene, cyclohexane, Stoddard solvent, ethyl acetate, methyl ethyl ketone and the like. The amount of solvent present in the cement composition is not critical. It must be sufficient however to reduce the teleblock polymer to a viscosity that can be easily applied to the surface of the material to be bonded. Various materials such as tacky fluid, antioxidants, and stabilizers are well known to the art and may be employed in the cement composition.

By slightly overlapping the edges of the strips, a waterproof, resilient layer is formed. The tile interstices can then be grouted in the usual manner.

The polymer matting can be used as a backing for tiles or linoleums or similar products. Tiles backed with this polymer which lends a springy quality to the tiles provides special comfort for walking or standing upon a concrete substrate. Teleblock matted tiles not only provide a moisture resistant backing but also provide sound deadening effects when placed on walls, floors, or the like. Tiles laid on wooden floors, and the like, would protect the wood from moisture which cannot penetrate the teleblock backing.

Sheets of the tile can be manufactured to enable the consumer to cut by any convenient means, such as with a scissors, the exact shape or size of tile design desired. The tile can be commercially applied to the polymer backing thus insuring uniform spacing or design.

Illustrative of the foregoing discussion and not to be interpreted as a limitation on the scope thereof is the following example:

EXAMPLE I

Standard one square inch tiles were attached to a radial teleblock backing (35/65 styrene-butadiene) by rendering the rubber tacky with benzene. The tiles were spaced in a rectangular pattern with a one-inch spacing. They were firmly attached to this backing and could be handled freely.

A tile-backing assembly, 4 x 4 inches square, was placed on a ¼-inch plywood sheet which had not been treated in any way and glued to the wood by rendering the rubber backing slightly tacky with benzene. The square adhered tightly to the substrate. Then the interstices were grouted and finished in the usual manner. An attractive tile overlay on wood was formed. No water penetrated to the wood in the grouting step and the entire tile unit made an effective waterproof cover for the wood substrate.

The cementing can also be done by use of a solution of a teleblock polymer and a readily vaporizable solvent such as acetone or benzene. Any substrate can be used which is receptive to rubber cement, such as cardboard, asbestos board, sheeting, plaster, wood and the like. The rubber is strong enough to permit large size units to be made, even rows of tiles are possible which can be cut and shaped by a knife or by scissors.

By using a layer of the rubber from about 30–55 mils, resiliency is increased and by using a slightly foamed material both the sound deadening effectiveness and insulating qualities are enhanced.

As will be evident to those skilled in the art, various modifications of this invention can be made or followed, in the light of the disclosure and the discussion herein, without departing from the scope and spirit thereof.

I claim:

1. An article of manufacture comprising tile bonded to a backing of unvulcanized high green-strength teleblock polymer which comprises polymers of a conjugated diene and a vinyl aromatic compound.

2. The article of claim 1 wherein said unvulcanized high green-strength teleblock polymer backing comprises 60 to 80 weight percent butadiene and 40 to 20 weight percent styrene, and wherein said teleblock polymer is one of a radial copolymer of styrene and butadiene and a linear copolymer of styrene and butadiene.

3. The article of claim 2 wherein said teleblock polymer backing is a polymer comprising 65 weight percent butadiene and 35 weight percent styrene and said backing is about 10 to 60 mils in thickness.

4. The article of claim 1 wherein said unvulcanized high green-strength teleblock polymer backing is bonded to said tile by rendering said polymer backing tacky by using as a solvent swelling material benzene, acetone, toluene, xylene, cyclohexane, Stoddard solvent, ethyl acetate, methyl ethyl ketone, or mixtures thereof, and laying the tile directly thereonto.

5. The article of claim 1 wherein said unvulcanized high green-strength teleblock polymer backing is bonded to said tile by the application of a bonding cement consisting of a solution of teleblock polymer which comprises polymers of a conjugated diene and a vinyl aromatic compound and as a solvent acetone, benzene, toluene, xylene, cyclohexane, Stoddard solvent, ethyl acetate, methyl ethyl ketone or mixtures thereof.

6. The article of claim 1 wherein said tile is ceramic tile.

7. A method of using and applying tile that is bonded to a backing of unvulcanized high green-strength teleblock copolymer of a conjugated diene and a vinyl aromatic compound, so as to provide an attractive, waterproofed, insulated, sound deadening, resilient, substrate overlay, comprising the steps of:
   (a) rendering said unvulcanized high green-strength teleblock copolymer backing tacky;
   (b) attaching said tile backing directly to a substrate of wood, cement, cardboard, asbestos board, sheeting, or plaster; and
   (c) grouting interstices between individual tiles.

8. The article of claim 1 wherein said unvulcanized high green-strength teleblock polymer contains 60–80 weight percent of polymerized butadiene, isoprene, 2,3-methyl-1,3-butadiene, piperylene, 3-butyl-1,3-octadiene, 1-phenyl-1,3-butadiene, or mixtures thereof, and correspondingly 40–20 weight percent of copolymerized styrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, or mixtures thereof.

9. The method of claim 7 wherein said rendering is with a swelling solvent material selected from the group consisting of benzene, acetone, toluene, xylene, cyclohexane, Stoddard solvent, ethyl acetate, methyl ethyl ketone, or mixtures thereof.

10. The method of claim 8 wherein said rendering is by applying a bonding cement comprising a solution of unvulcanized high green-strength teleblock polymer which comprises polymers of a conjugated diene and a vinyl aromatic compound, and a solvent of acetone, benzene, toluene, xylene, cyclohexane, Stoddard solvent, ethyl acetate, methyl ethyl ketone, or mixtures thereof.

References Cited

UNITED STATES PATENTS

| | | | |
|---|---|---|---|
| 2,628,180 | 2/1953 | Iverson | 161—203 |
| 3,030,346 | 4/1962 | Cooper, Jr. | 260—83.7 |
| 3,281,383 | 10/1966 | Zelinski et al. | 260—85.1 |
| 3,319,392 | 5/1967 | Fitzgerald | 52—389 |
| 3,335,048 | 8/1967 | Morain | 161—38 |
| 3,438,845 | 4/1969 | Cohen et al. | 161—253 |
| 3,439,064 | 4/1969 | Makowski et al. | 161—203 |
| 3,442,730 | 5/1969 | Dietz | 156—71 |

JOHN T. GOOLKASIAN, Primary Examiner

D. J. FRITSCH, Assistant Examiner

U.S. Cl. X.R.

52—390; 156—299, 308, 309; 161—38, 39, 203, 205, 250, 255

UNITED STATES PATENT OFFICE     18119 LHC

CERTIFICATE OF CORRECTION

Patent No. 3,594,252     Dated: July 20, 1971

Betty B. Weinberg

It is certified that error appears in the above-identified patent and that said Letters Patent are hereby corrected as shown below:

Col. 5, Claim 10, line 1 of claim 10, after "claim" and before "wherein" the dependency should be changed to --- 7 ---.

Signed and sealed this 25th day of April 1972.

(SEAL)
Attest:

EDWARD M. FLETCHER, JR.
Attesting Officer

ROBERT GOTTSCHALK
Commissioner of Patents